US008370441B2

(12) United States Patent
Ananthanarayanan et al.

(10) Patent No.: US 8,370,441 B2
(45) Date of Patent: Feb. 5, 2013

(54) PROCESSING OF A MOBILE TERMINATED DATA OVER SIGNALING MESSAGE

(75) Inventors: Arulmozhi K. Ananthanarayanan, San Diego, CA (US); Ashu Razdan, San Diego, CA (US); Biren Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3578 days.

(21) Appl. No.: 12/376,745

(22) PCT Filed: Sep. 28, 2007

(86) PCT No.: PCT/US2007/079847
§ 371 (c)(1),
(2), (4) Date: Feb. 6, 2009

(87) PCT Pub. No.: WO2008/039970
PCT Pub. Date: Apr. 3, 2008

(65) Prior Publication Data
US 2010/0036921 A1 Feb. 11, 2010

Related U.S. Application Data

(60) Provisional application No. 60/827,427, filed on Sep. 28, 2006.

(51) Int. Cl.
*G06F 15/16* (2006.01)
*G08C 15/00* (2006.01)
(52) U.S. Cl. ......... 709/206; 370/230; 370/235; 370/389
(58) Field of Classification Search ................... 370/310, 370/336; 455/403, 458, 426.1, 574; 713/320–323; 709/206
See application file for complete search history.

(56) References Cited

U.S. PATENT DOCUMENTS

| 3,986,119 | A | * | 10/1976 | Hemmer et al. ............... 455/15 |
| 5,797,094 | A | | 8/1998 | Houde et al. |
| 5,991,600 | A | * | 11/1999 | Anderson et al. ............ 340/7.34 |
| 6,928,289 | B1 | * | 8/2005 | Cho et al. .................... 455/452.2 |
| 7,072,697 | B2 | * | 7/2006 | Lappetelainen et al. ...... 455/574 |
| 7,613,484 | B2 | * | 11/2009 | Lappetelinen et al. ........ 455/574 |
| 7,720,438 | B2 | * | 5/2010 | Rowse ........................ 455/41.1 |
| 2004/0259542 | A1 | | 12/2004 | Viitamaki et al. |
| 2005/0009548 | A1 | | 1/2005 | Kelley et al. |
| 2005/0032538 | A1 | | 2/2005 | Noel et al. |
| 2005/0078653 | A1 | | 4/2005 | Agashe et al. |

(Continued)

FOREIGN PATENT DOCUMENTS

| CN | 1175339 A | 3/1998 |
| CN | 1323495 A | 11/2001 |

(Continued)

OTHER PUBLICATIONS

International Search Report—PCT/US2007/079847, International Searching Authority—European Patent Office—Feb. 7, 2008.

(Continued)

*Primary Examiner* — Hassan Kizou
*Assistant Examiner* — Emmanuel Maglo
(74) *Attorney, Agent, or Firm* — Raphael Freiwirth

(57) ABSTRACT

Systems and methods for processing a data over signaling (DoS) message at an access terminal are disclosed. A message is received at an access terminal. The message is decoded to determine if it is a DoS message. Upon detecting the DoS message a sleep delay timer is set to prevent the access terminal from entering a sleep state for a predetermined time.

18 Claims, 6 Drawing Sheets

U.S. PATENT DOCUMENTS

| | | |
|---|---|---|
| 2005/0287949 A1 | 12/2005 | Harris et al. |
| 2006/0107081 A1* | 5/2006 | Krantz et al. .................. 713/300 |
| 2006/0148469 A1* | 7/2006 | Kim ........................... 455/426.1 |
| 2006/0165043 A1* | 7/2006 | Yoon .............................. 370/346 |
| 2006/0270382 A1* | 11/2006 | Lappetelainen et al. ... 455/343.2 |
| 2007/0238442 A1* | 10/2007 | Mate et al. ..................... 455/403 |
| 2008/0285451 A1* | 11/2008 | Tu et al. ......................... 370/233 |
| 2010/0041349 A1* | 2/2010 | Mahany et al. ................. 455/88 |

FOREIGN PATENT DOCUMENTS

| | | |
|---|---|---|
| CN | 1582013 A | 2/2005 |
| JP | 11252004 A | 9/1999 |
| JP | 2003087185 | 3/2003 |
| JP | 2007166676 A | 6/2007 |
| WO | WO9619084 A1 | 6/1996 |
| WO | WO0010353 A1 | 2/2000 |
| WO | WO2005011296 A2 | 2/2005 |
| WO | 2006002214 | 1/2006 |

OTHER PUBLICATIONS

Written Opinion—PCT/US2007/079847, International Searching Authority—European Patent Office—Feb. 7, 2008.

International Preliminary Report on Patentability—PCT/US07/079847, International Search Authority—European Patent Office—Munich—Jan. 9, 2009.

C.S0024-B, "cdma2000 High Rate Packet Data Air Interface Specification", May 2006.

* cited by examiner

PROCESSING OF A MOBILE TERMINATED DATA OVER SIGNALING MESSAGE

The present application claims priority to PCT Patent Application No. PCT/US2007/079847 filed Sep. 28, 2007 which claims priority to provisional U.S. Application Ser. No. 60/827,427, entitled "METHOD TO PREPARE FOR ORIGINATION BASED UPON RECEIPT OF A MOBILE TERMINATED DATA OVER SIGNALING MESSAGE," filed Sep. 28, 2006, and assigned to the assignee hereof and hereby expressly incorporated by reference herein.

BACKGROUND OF THE INVENTION

1. Field

The present invention generally relates to communications in a wireless environment. More particularly, the invention relates to message processing in an access terminal in a wireless communication system.

2. Background

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems mobile stations, handsets, or access terminals receive signals from fixed position base stations (also referred to as cell sites or cells) that support communication links or service within particular geographic regions adjacent to or surrounding the base stations. Conventionally, each mobile station monitors a control channel that can be used to exchange messages between the mobile station and the base station. The control channel is used to transmit system/overhead messages, whereas traffic channels are conventionally used for substantive communication (e.g., voice and data) to and from the mobile station. For example, the control channel can be used to establish traffic channels, control power levels, and the like, as is known in the art. Generally, when a control channel signal has been received by the mobile station communications modem and is being processed by the mobile station, the mobile station performs power management by lowering or shutting down power to a communication modem, antenna, transmitter and/or receiver. While this conserves power to the mobile station, it may cause problems for delay-sensitive applications that will have to wait for the power startup cycle after processing a response to the control channel signal. Therefore, system engineers may face a trade-off between power conservation and poor responsiveness.

SUMMARY OF THE EXEMPLARY EMBODIMENTS

Exemplary embodiments of the present invention are directed to a systems and methods for message processing in an access terminal in a wireless communication system.

Accordingly, an embodiment of the invention can include a method comprising: detecting a data over signaling (DoS) message at an access terminal; and delaying a sleep state at the access terminal for a predetermined time after detection of the DoS message.

Another embodiment can include an apparatus comprising: logic configured to detect a data over signaling (DoS) message at an access terminal; and logic configured to delay a sleep state at the access terminal for a predetermined time after detection of the DoS message.

Another embodiment can include a system comprising: means for detecting a data over signaling (DoS) message at an access terminal; and means for delaying a sleep state at the access terminal for a predetermined time after detection of the DoS message.

Another embodiment can include a computer readable media embodying a method for processing messages at an access terminal, the method comprising: detecting a data over signaling (DoS) message at the access terminal; and delaying a sleep state at the access terminal for a predetermined time after detection of the DoS message.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention.

DETAILED DESCRIPTION

Figure 1:
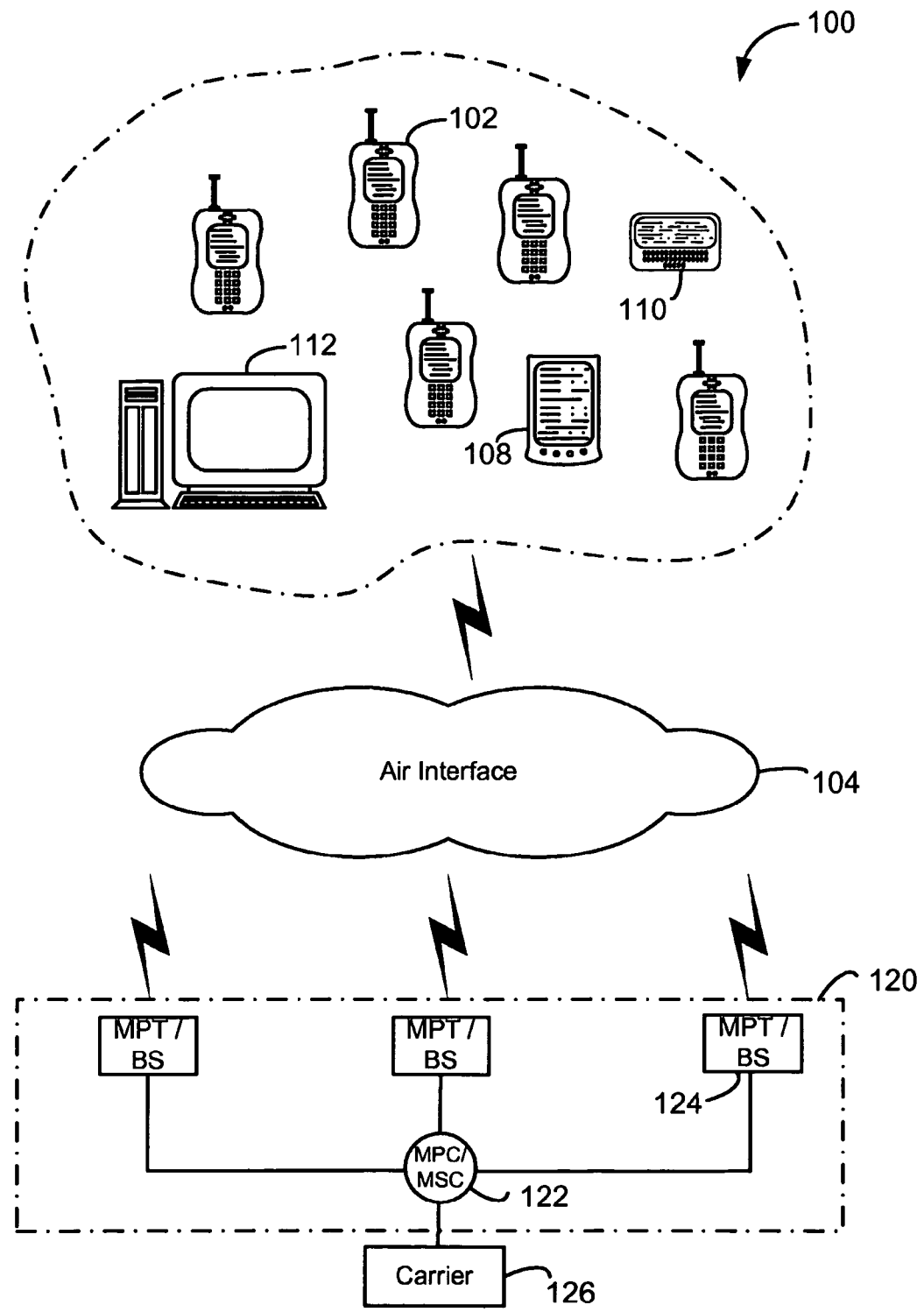
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of embodiments of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation. Also, as used herein the terms "mobile station", "mobile terminal", "handset," "access terminal (AT)", "wireless device" and the like are used interchangeably. The terms "sleep" and "start up" as used herein to mean the power management of shutting down all or partial power to the mobile station's modem, antenna, transmitter and/or receiver modules. An AT that is in the "sleep mode or sleep state" does not monitor the Control Channel or any over-the-air messages that are transmitted in the network.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller and/or mobile switching center (MSC). Modem pool transceivers and modem pool controllers are parts of a network called an access network. An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof.

Referring back to FIG. 1, the components of the wireless system 100 and interrelation of the elements of embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, wireless network carrier 126, the Internet, and/or other remote servers.

The RAN 120 processes and routes messages (conventionally sent as data packets) sent to a MPC/MSC 122. The carrier network 126 may communicate with the MPC/MSC 122 by a network, the Internet and/or a public switched telephone network (PSTN). Alternatively, the MPC/MSC 122 may connect directly to the Internet or external network. Conventionally, the network or Internet connection between the carrier network 126 and the MPC/MSC 122 transfers data, and the PSTN transfers voice information. The MPC/MSC 122 can be connected to multiple base stations (BS) or modem pool transceivers (MPT) 124. In a similar manner to the carrier network, the MPC/MSC 122 is conventionally connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, MPC/MSC 122 and other components may form the RAN 120, as is known in the art. However, alternate configurations may also be used and the invention is not limited to the configuration illustrated.

Figure 2:
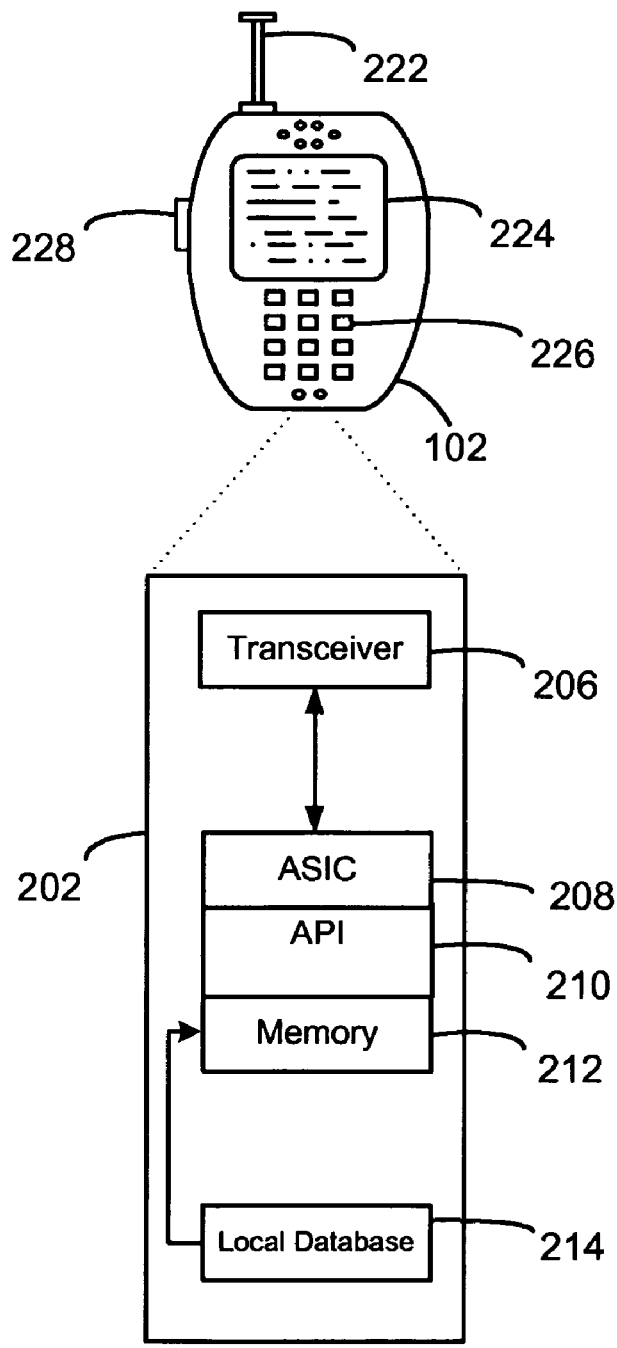
FIG. 2 is an illustration of an access terminal in accordance with at least one embodiment of the invention.

Referring to FIG. 2, the access terminal 102, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is conventionally a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality may be incorporated into one discrete component. Therefore, the features of the access terminal in FIG. 2 are to be considered merely illustrative and embodiments of the invention are not limited to the illustrated features or arrangement.

Accordingly an embodiment of the invention may include an access terminal comprising: logic configured to detect a DoS message; and logic configured to delay the access terminal from entering a sleep state, based on the detection of the DoS message. As discussed above, the logic can be embodied in any combination of software and/or hardware configured to perform the described functions. For example, an application operating on access terminal 102 may include all the logic elements discussed above. Alternatively, an application may only contain selected logic elements that interact with one or more other resident applications and/or hardware elements (e.g., API layer 210, processor/ASIC 208, memory 212, and the like) containing the remaining logic to perform the functionality describe herein.

The wireless communication between the access terminal 102 and the RAN 120 can be based on different technologies, such as code division multiple access (CDMA), time division multiple access (TDMA), frequency division multiple access (FDMA), the Global System for Mobile Communications (GSM), or other protocols that may be used in a wireless communications network or a data communications network. The data communication is conventionally between the access terminal 102, MPT/BS 124, and MPC/MSC 122. The MPC/MSC 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN.

Since wireless devices are conventionally resource limited in terms of power, it is advantageous to set the wireless device's communication modem/transceiver and related transmission components into a low power, idle state or sleep mode, as is known in the art. Conventionally, these sleep states can occur even after a control channel or traffic channel message is received from the RAN.

Some systems permit messages including data that may be directed for a specific application and/or processing at the access terminal. For example, a data over signaling (DoS) message can be sent by the RAN for use by the access terminal. However, even when an access terminal receives a signal, such as a DoS message, it may go into a sleep state between the time the message is received at the access terminal and the time that an application responds after processing the data from the signal.

For example, the 1xEV-DO standard allows for delivery of data without the need for bringing up a traffic channel using the Data Over Signaling (DoS) protocol. Certain high priority applications including group communications/Push-to-Talk (PTT) applications may use the DoS protocol. For example, at PTT system may use a DoS message to initiate a call. Accordingly, embodiments of the invention allow the access terminal receiving a DoS message to stay awake in preparation for responding to the DoS message, transmitting another DoS message in response to the original DoS message or for returning messages to indicate delivery of messages, and the like, as discussed in further below.

Figure 3:
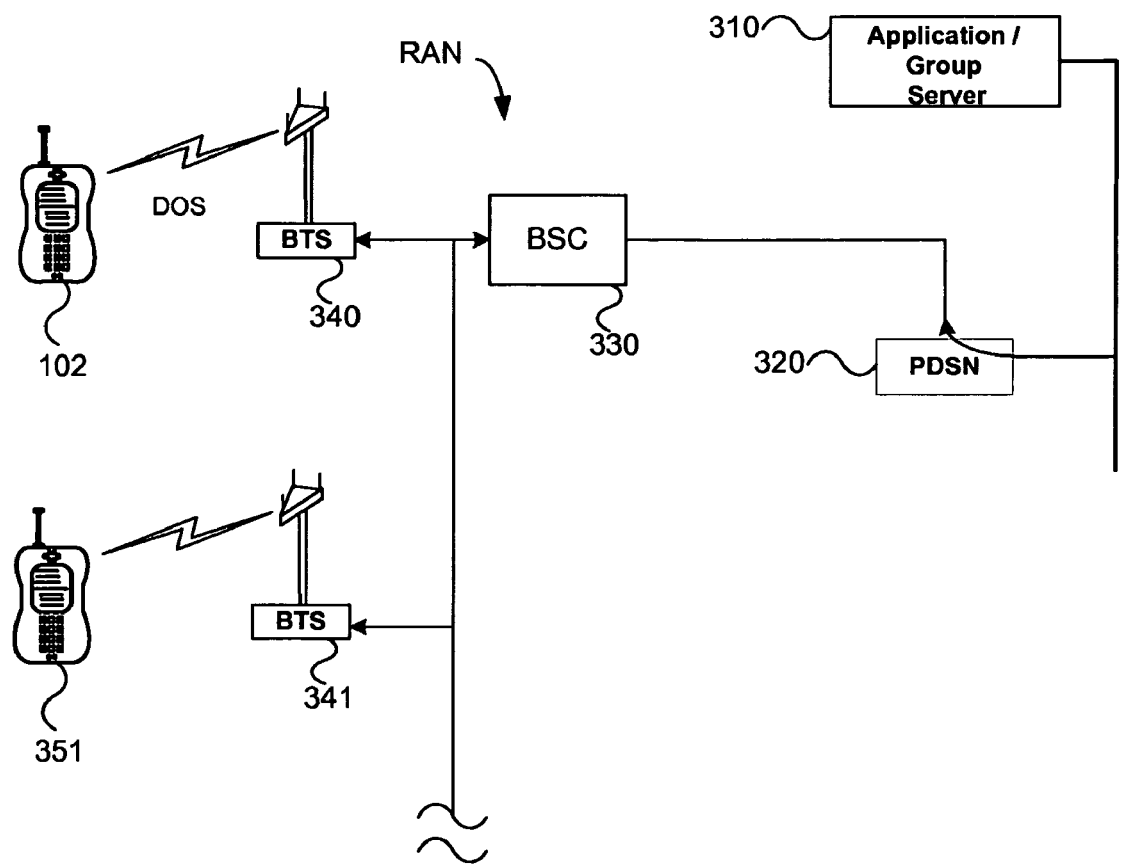
FIG. 3 is a system diagram in accordance with at least one embodiment of the invention.

Referring to FIG. 3, a system diagram is illustrated in accordance with embodiments of the invention. An application server 310 can be coupled to packet data serving node (PDSN) 320, which can function in cooperation with the BSC 330 to receive the message from application server 310, decode the message and forward the appropriate directions to BTSs (e.g., 340 and 341) for transmission to one or more access terminals (e.g., 102 and 351). The paging is conventionally generated from the RAN and may be sent from multiple BTSs to identify the targeted access terminal. Likewise the RAN may process a DoS message that was directed to a specific access terminal (e.g., 102).

Those skilled in the art will appreciate that conventionally many elements of the wireless infrastructure work cooperatively to provide services to and from the access terminals. Further, the functionality of each of the various elements may be relocated to other elements operably connected to the wireless system without changing the overall functionality. Therefore, the invention is not limited to the illustrated configuration. Further, the discussion of system elements that may contain the functions of embodiments of the invention is merely for illustrative purposes and should not be construed to limit the embodiments of the invention to the discussed configurations.

Figure 4:
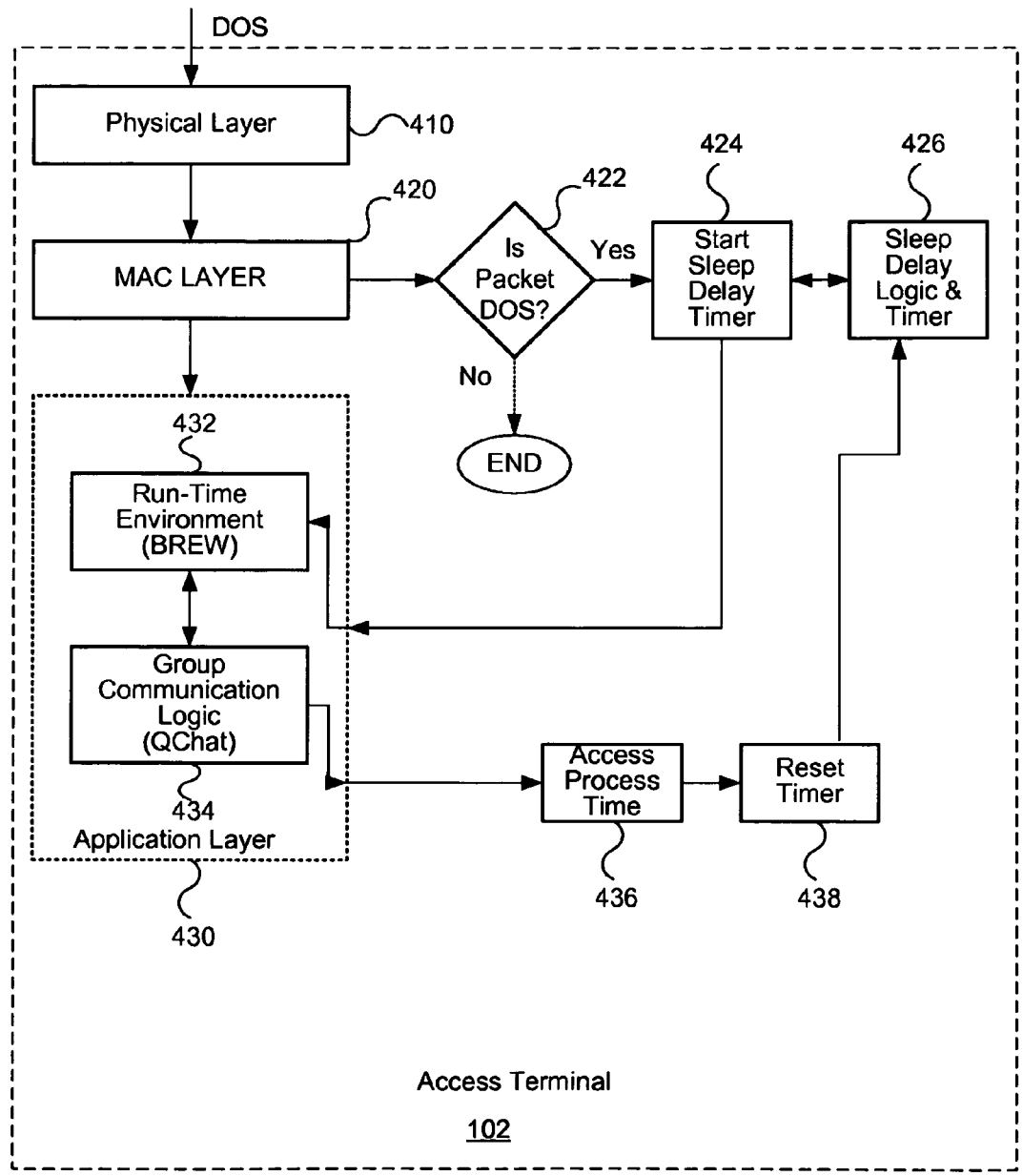
FIG. 4 is a signal flow diagram in accordance with at least one embodiment of the invention.

Referring to FIG. 4, when the DoS message is received at the access terminal 102, the message is first processed at the physical layer 410 and then forwarded to the medium access (MAC) layer 420. At the MAC layer, the message is decoded to check if it is a DoS message, 422. If the message contains a DoS packet, a start sleep delay timer 424 can be initiated that prevents the access terminal 102 from entering a sleep state via sleep delay logic and timer 426. Preventing the access terminal 102 from entering a sleep state can lead to considerable savings for delay sensitive applications, such as group communication applications. In conventional systems, the delay between decoding of the DoS packet, the receipt of the DoS message at the application layer 430, and application layer 430 response to the communication contained in the packet, may cause the access terminal 102 to enter a sleep state, which can further delay the ultimate processing and response to the DoS message. However, by setting the sleep delay timer 426, the access terminal 102 is prevented from entering a sleep state for a limited time (e.g., 50 ms.), which prevents additional processing/response delays due to the access terminal 102 entering the sleep state and then waking up again. Further, upon receipt of multiple DoS, messages the time limit can be reset to ensure sufficient time for processing/response to the DoS message. However, those skilled in the art will appreciate that extending the time limit for delaying the sleep state impacts the battery life of the access terminal 102 and should be set according to the expected processing/response delays.

As illustrated in FIG. 4, the DoS message can be passed to an application layer 430 from the MAC layer 420 for further processing, as is known in the art. In some embodiments, DoS packets may be ignored based upon types of DoS packets, the number of DoS packets received within a time period, whether the application is active or loaded, or other type of filtering capability based on the environment of the AT (e.g., low battery). Further, alternate paths are illustrated from the MAC layer 420 to the application layer 430 to emphasize that embodiments of the invention are not limited to communication between the layers as illustrated and discussed herein.

The application layer 430 may contain applications/processes that can use the data contained in the DoS message. Further, the application layer 430 may have applications/processes that operate independently or in cooperation with other applications/processes in the application layer 430. For example, as illustrated in FIG. 4, a run-time environment 432 (e.g., QUALCOMM's Binary Runtime Environment for Wireless (BREW®)) may be present that can host a variety of client applications and serve as a platform to allow a consistent interface (e.g., via APIs) to the features of the access terminal 102. One of the client applications can include group communication logic 434 (e.g., QUALCOMM's QChat®), for initializing and receiving group communication calls. When responding to the DoS message, there will be a processing time (e.g., the time for the application to process the DoS message and respond 436) at the application layer 430. Upon completion of the processing time 436 of the application, the sleep delay timer can be reset 438 and the application can take control of the sleep functions (e.g., preventing/allowing the access terminal to enter the sleep state). Another embodiment may simply signal the sleep delay logic and timer 426 which will then determine when and if to reset the timer, which may be dependent on other events in the AT. In yet another embodiment, the sleep delay logic and timer 426 may independently decide when and if to reset the timer based on profiles and configuration data regardless of the application layer 430 requests. Accordingly, it will be appreciated by those skilled in the art that system designers may implement various strategies for improved responsiveness upon receipt of DoS messages using embodiments of the invention while still including system specific design considerations.

As noted above, embodiments of the invention can reduce the delays in delay sensitive applications. A group communication system is an example of a delay sensitive system that can take advantage of reduced connection times offered by the embodiments disclosed herein. The group communication system may also be known as a push-to-talk (PTT) system, a net broadcast service (NBS), a dispatch system, or a point-to-multi-point communication system. Conventionally, a group of access terminal users can communicate with one another using an access terminal assigned to each group member. The term "group member" denotes a group of access terminal users authorized to communicate with each other. Although, group communication systems/PTT systems may be considered to be among several members, the system is not limited to this configuration and can apply to communication between individual devices on a one to one basis.

The group may operate over an existing communications system, without requiring substantial changes to the existing infrastructure. Thus, a controller and users may operate in any system capable of transmitting and receiving packet information using Internet protocol (IP), such as a Code Division Multiple Access (CDMA) system, a Time Division Multiple Access (TDMA) system, a Global System for Mobile Communications (GSM) system, satellite communication systems, combinations of land line and wireless systems, and the like.

Group members may communicate with each other using an assigned access terminal, such as ATs 102 and 108. The ATs may be wireline or wireless devices such as terrestrial wireless telephones, wireline telephones having push-to-talk capability, satellite telephones equipped with push-to-talk functionality, laptop or desktop computers, paging devices, or any combination thereof. Furthermore, each AT may be able to send and receive information in either a secure mode, or a non-secure (clear) mode. It should be understood that reference to an access terminal (AT) is not intended to be limited to the illustrated or enumerated examples, and may encompass other devices that have the capability to transmit and receive packet information in accordance with the Internet Protocol (IP).

When a group member wishes to transmit information to other members of the group, the member may request the transmission privilege by pressing a push-to-talk button or key (e.g., 228 in FIG. 2) on an AT, which generates a request formatted for transmission over a distributed network. For example AT 102, may generate a request to be transmitted over the air to one or more MPTs (or base stations) 124. A MPC/MSC 122, which may include a well-known interworking function (IWF), packet data serving node (PDSN), or packet control function (PCF), for processing data packets may exist between MPT/BS 124 and the distributed network. However, the requests may also be transmitted through the public switched telephone network (PSTN) to a carrier network 126. The carrier network 126 may receive the request and provide it to distributed network 120.

Figure 5:
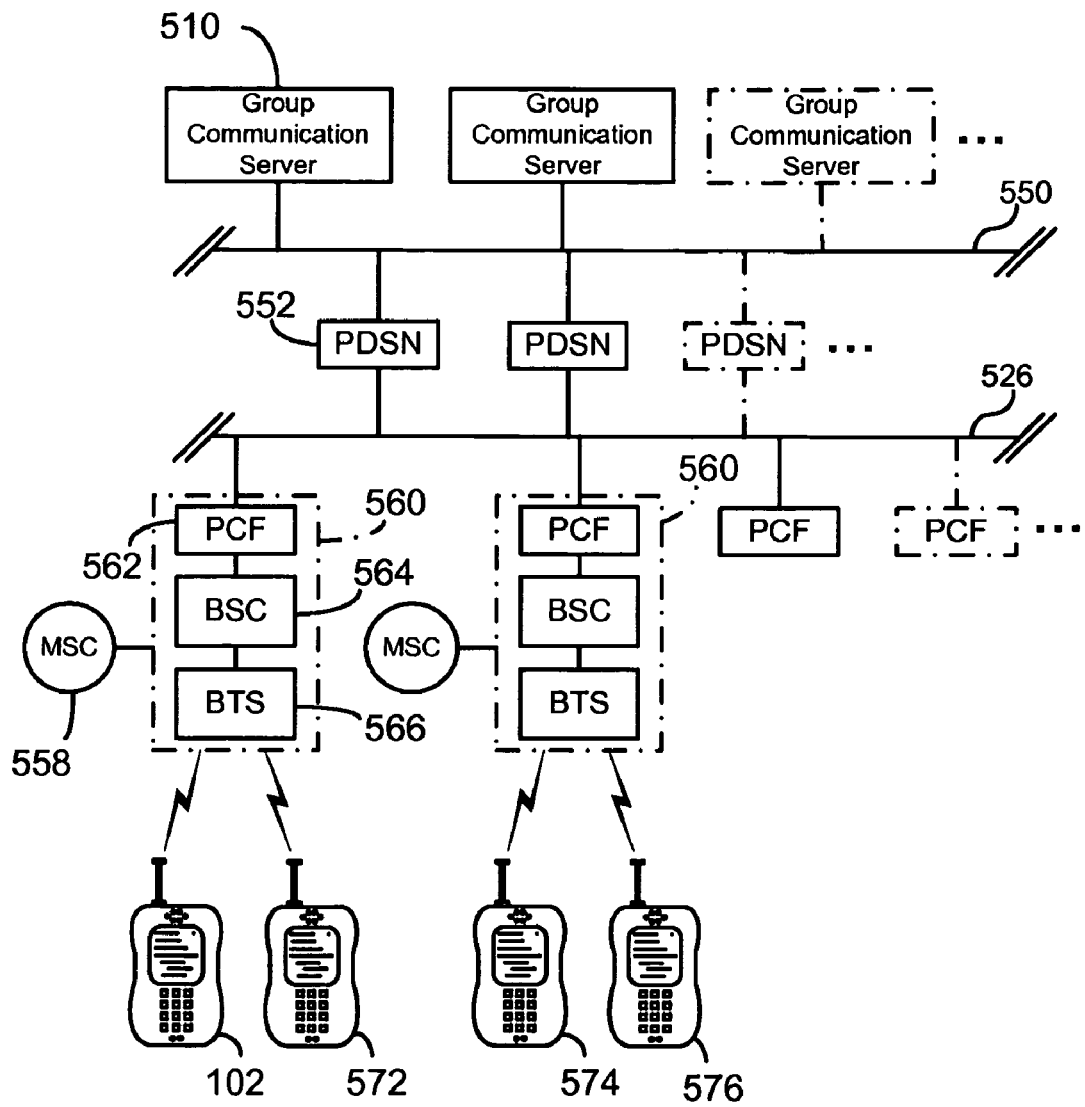
FIG. 5 is a diagram of a group communication network architecture in accordance with at least one embodiment of the invention.

Referring to FIG. 5, one or more group communication servers 510, can monitor traffic of the group communication system through its connection to distributed network. Since group communication server 510 can be connected to the distributed network through a variety of wired and wireless interfaces, geographic proximity to group participants is not necessary. Conventionally, a group communication server 510 controls communications between the wireless devices of set group members (ATs 102, 572, 574, 576) in a PTT system. The wireless network illustrated is merely exemplary and can include any system whereby remote modules communicate over-the-air between and among each other and/or between and among components of a wireless network including, without limitation, wireless network carriers and/or servers. A series of group communication servers 510 can be connected to a group communication server LAN 550.

The group communication server(s) 510 can be connected to a wireless service provider's packet data service node (PDSN) such as PSDN 552, shown here resident on a carrier network 526. Each PSDN 552 can interface with a base station controller 564 of a base station 560 through a packet control function (PCF) 562. The PCF 562 may be located in the base station 560. The carrier network 526 controls messages (generally in the form of data packets) sent to a MSC 558. The MSC 558 can be connected to one or more base stations 560. In a similar manner to the carrier network, the MSC 558 is conventionally connected to the BTS 566 by both the network and/or Internet for data transfer and PSTN for voice information. The BTS 566 ultimately broadcasts and receives messages wirelessly to and from the wireless ATs, such as cellular telephones 102, 572, 574, 576, as is well known in the art. Accordingly, the details of a group communication system will not be further discussed.

In view of the foregoing, those skilled in the art will appreciate that embodiments of the invention may be singular devices or include many components. For example, at least one embodiment of the invention may include an apparatus including logic configured to detect a data over signaling (DoS) message at an access terminal and logic configured to delay a sleep state at the access terminal for a predetermined time after detection of the DoS message. At this level the apparatus may be the access terminal itself. However, embodiments of the invention are not limited to only this aspect, as the apparatus may further include an access network that transmits the DoS message to the access terminal over an air interface. Still further, the apparatus may include a group communication server and the DoS message can be generated in response to a message from the group communication server to the access network requesting communication with the access terminal. Accordingly, embodiments of the invention can encompass both the individual elements and a system for group communication, as discussed in the foregoing.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Figure 6:
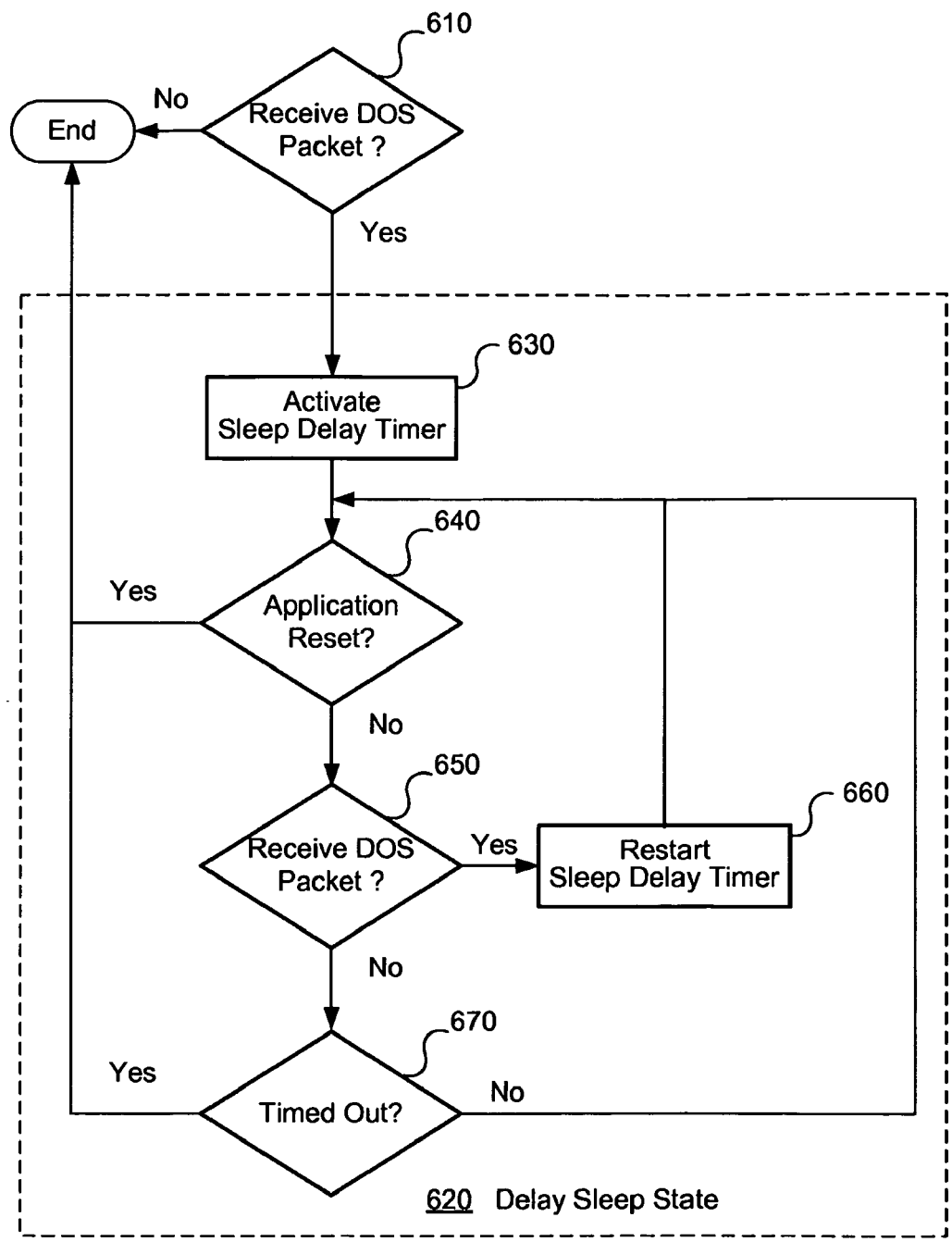
FIG. 6 is a flowchart illustrating at least one method in accordance with at least one embodiment of the invention.

Those skilled in the art will appreciate that embodiments of the invention include methods for performing the functions, processes, sequences and/or algorithms described herein. For example, referring to FIG. 6, an embodiment of the invention may include a method including detecting a data over signaling (DoS) message, 610, at an access terminal and delaying a sleep state, 620, at the access terminal for a predetermined time upon detection of the DoS message. Further, the process of delaying the sleep state can include many variations, such as those discussed herein and embodiments of the invention are not limited to any specific features of the sleep state delay function.

For example, the delaying the sleep state can include activating a sleep timer, 630 and preventing the sleep state while the sleep delay timer is active (e.g., not timed out, 670). However, other considerations may alter the duration of the sleep state delay and/or initiation of the sleep state. For example, the sleep delay timer may be reset/deactivated after an application receives the DoS message, 640. As discussed above, once an application has received the DoS message, it can reset/deactivate the sleep delay timer and/or disable the sleep state entirely, as designated by the system designers.

Alternatively, if an application does not take control of the sleep delay process, and a subsequent DoS message is received, 650, the sleep delay timer may be restarted, 660, to allow the predetermined time (e.g., 50 ms) to elapse for the subsequent DoS message. This will provide the opportunity for an application to receive and process the subsequent DoS message regardless of how close the system is to timing out from the previous DoS message.

Additionally, as discussed in the foregoing, a packet can be received at a physical layer and then decoded at a medium access (MAC) layer to detect if it contains the DoS message. The DoS message can be forwarded to the application layer for further processing by an application (e.g., PTT). The sleep delay allows time for the application to receive and process the DoS message before the access terminal enters a sleep state, which could further delay the response to/processing of the DoS message. However, the sleep state delay can be limited (e.g., timed out 670) to prevent excessive batter drain, even if the application does not respond.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

Accordingly, an embodiment of the invention can include a computer readable media embodying methods to perform the functionalities described herein. For example, an embodiment can include a computer readable media embodying a method for processing messages at an access terminal, the method comprising: detecting a data over signaling (DoS) message at an access terminal; and delaying a sleep state at the access terminal for a predetermined time after detection of the DoS message. Other embodiments can include a system comprising: means for detecting a data over signaling (DoS) message at an access terminal; and means for delaying a sleep state at the access terminal for a predetermined time after detection of the DoS message. Accordingly, the invention is not limited to the illustrated examples and any means for performing the functionalities, sequence of actions, and/or algorithms described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method comprising:
   detecting a data over signaling (DoS) message at an access terminal; and
   delaying a sleep state at the access terminal for a predetermined time after detection of the DoS message, wherein delaying the sleep state further comprises:
   activating a sleep delay timer; and
   preventing the sleep state while the sleep delay timer is active,
   wherein the DoS message is generated in response to a message from a server to an access network requesting communication with the access terminal.

2. The method of claim 1, further comprising:
   deactivating the sleep delay timer, after an application receives the DoS message.

3. The method of claim 1, further comprising:
   restarting the sleep delay timer, if a subsequent DoS message is received, to allow the predetermined time to elapse for the subsequent DoS message.

4. The method of claim 1, wherein detecting the DoS message further comprises:
   receiving a packet at a physical layer; and
   decoding the packet at a medium access (MAC) layer to detect if it contains the DoS message.

5. The method of claim 1, wherein the access terminal is at least one of a mobile terminal, a cellular phone, or wireless device.

6. The method of claim 1, wherein delaying the sleep state at the access terminal further comprises staying awake in preparation for responding to the DoS message.

7. The method of claim 2, wherein the application is a push-to-talk application resident on the access terminal.

8. The method of claim 2, further comprising:
   receiving an indication that the application has completed processing the DoS message; and
   deactivating the sleep delay timer after receiving the indication.

9. The method of claim 4, further comprising:
   forwarding the DoS message to an application layer.

10. The method of claim 5, wherein the access network transmits the DoS message to the access terminal over an air interface.

11. The method of claim 10, wherein the server is a group communication server.

12. A system comprising:
   means for detecting a data over signaling (DoS) message at an access terminal;
   means for delaying a sleep state at the access terminal for a predetermined time after detection of the DoS message, wherein delaying the sleep state further comprises:
   means for activating a sleep delay timer; and
   means for preventing the sleep state while the sleep delay timer is active; and
   a communication means, wherein the DoS message is generated in response to a message from the communication means to an access network requesting communication with the access terminal.

13. The system of claim 12, wherein delaying the sleep state further comprises:
   means for deactivating the sleep delay timer, after an application receives the DoS message.

14. The system of claim 12, wherein the communication means is a group communication means.

15. The system of claim 13, further comprising:
   means for restarting the sleep delay timer, if a subsequent DoS message is received to allow the predetermined time to elapse for the subsequent DoS message.

16. A non-transitory computer readable media embodying a method for processing messages at an access terminal, the method comprising:
   detecting a data over signaling (DoS) message at the access terminal; and
   delaying a sleep state at the access terminal for a predetermined time after detection of the DoS message, comprising:
   activating a sleep delay timer; and
   preventing the sleep state while the sleep delay timer is active,
   wherein the DoS message is generated in response to a message from a server to an access network requesting communication with the access terminal.

17. The computer readable media of claim 16, wherein the method further comprises:
   deactivating the sleep delay timer, after an application receives the DoS message.

18. The computer readable media of claim 16, wherein the method further comprises:
   restarting the sleep delay timer, if a subsequent DoS message is received to allow the predetermined time to elapse for the subsequent DoS message.

* * * * *